United States Patent
Tsuchiya

(10) Patent No.: US 9,613,430 B2
(45) Date of Patent: Apr. 4, 2017

(54) CAMERA SYSTEM AND SHAKE CORRECTION METHOD THEREOF

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/950,377

(22) Filed: Nov. 24, 2015

(65) Prior Publication Data
US 2016/0173781 A1 Jun. 16, 2016

(30) Foreign Application Priority Data
Dec. 15, 2014 (JP) .................. 2014-253508

(51) Int. Cl.
*G06T 7/20* (2017.01)
*H04N 5/232* (2006.01)

(52) U.S. Cl.
CPC ....... *G06T 7/2053* (2013.01); *H04N 5/23258* (2013.01); *H04N 5/23267* (2013.01); *G06T 2207/20201* (2013.01)

(58) Field of Classification Search
CPC ........... H04N 5/23251; H04N 5/23254; H04N 5/23258; H04N 5/23267; G06T 7/2053; G06T 2207/20201
See application file for complete search history.

(56) References Cited

U.S. PATENT DOCUMENTS

| 5,615,397 A | * | 3/1997 | Shiomi | ................ G03B 17/00 348/208.11 |
| 2009/0021589 A1 | * | 1/2009 | Okada | .................... G03B 5/00 348/208.1 |

FOREIGN PATENT DOCUMENTS

JP 07-104338 A 4/1995
JP 2006-126668 A 5/2006

* cited by examiner

*Primary Examiner* — Tuan Ho
(74) *Attorney, Agent, or Firm* — Volpe and Koenig, P.C.

(57) ABSTRACT

A camera system includes a lens having a first shake correction unit for correcting shaking on the basis of the amount of shaking which is detected by a first shake amount detector and from which a first reference value corresponding to an output value of the first shake amount detector kept in a stationary state is subtracted, and a body having a second shake correction unit for correcting shaking on the basis of the amount of shaking which is detected by a second shake amount detector and from which a second reference value corresponding to an output value of the second shake correction unit in a stationary state is subtracted. The camera system corrects a first reference value or a second reference value.

13 Claims, 9 Drawing Sheets

CAMERA SYSTEM AND SHAKE CORRECTION METHOD THEREOF

CROSS-REFERENCE TO RELATED APPLICATION

This application is based upon and claims the benefit of priority of the prior Japanese Patent Application No. 2014-253508, filed on Dec. 15, 2014, the entire contents of which are incorporated herein by reference.

FIELD

The present invention relates to a camera system in which both an interchangeable lens and a camera body have a shake correction function, and to a shake correction method thereof.

BACKGROUND

In recent years, cameras provided with a hand shake correction function have become popular, and it has become possible to take a satisfactory image without blurring even if particular attention is not paid when the image is shot with a camera held by hand.

In an interchangeable-lens camera in which a shooting lens is interchangeable in accordance with a shooting purpose, an interchangeable lens or a camera body is provided with a hand shake correction function depending on circumstances.

When an interchangeable lens is provided with a hand shake correction function, a sensor for detecting a movement applied to a camera is mounted in the interchangeable lens, and part of a group of shooting lenses is moved in a direction for canceling a detected shaking on a plane orthogonal to an optical axis, so that the shaking is corrected.

In the meantime, when the camera body is provided with a hand shake correction function, a sensor for detecting a movement applied to the camera is mounted in the camera body, and an imaging element is moved in a direction for canceling a detected shaking, so that the shaking is corrected.

Regardless of whether a hand shake correction function is provided in either the interchangeable lens or the camera body, there are advantages and disadvantages. Accordingly, in a camera system in which an interchangeable lens and a camera body have a connection compatibility, there may be cases where both the interchangeable lens and the camera body have the hand shake correction function and the camera system is used by combining the functions of the lens and the camera body, although this varies depending on a camera system or a camera maker.

In such a case, when both of the hand shake correction functions operate at the same time, an image blurring caused by shaking is excessively corrected, so that the resolution of a shot image is degraded due to the image blurring caused by the excessive correction. As a result, the effect of a hand shake correction cannot be produced.

Accordingly, when an image is shot by attaching an interchangeable lens provided with a hand shake correction function to a camera body also provided with a hand shake correction function, it is necessary to take measures to suspend either of the hand shake correction functions, or to apportion operation of both of the hand shake correction functions at a specified ratio.

As a solution that focuses on the above described problem, for example, a camera system described in Patent Document 1 (Japanese Laid-open Patent Publication No. 2006-126668) is presented. This camera system includes a camera having first shake correction means, and a lens device that is attached to the camera and has second shake correction means. The camera system further includes shake detection means provided in either of the camera and the lens device, and control means for obtaining a first amount of shake correction on the basis of a result of detection of the shake detection means. Then, the control means obtains a second amount of shake correction on the basis of the first amount of shake correction, and on the basis of the amount of movement of the first shake correction means or the second shake correction means that is driven in accordance with the first amount of the shake correction, so that an image blurring correction can be accurately made even if a plurality of image blurring correction functions are combined.

SUMMARY

One aspect of the present invention provides a camera system including an interchangeable lens having a first shake correction unit for correcting an image blurring caused by shaking, and a camera body having a second shake correction unit for correcting an image blurring caused by shaking. In the camera system, the first shake correction unit includes a first shake amount detector for detecting the amount of shaking, a first reference value subtraction unit for subtracting a first reference value corresponding to an output value of the first shake amount detector kept in a stationary state from the amount of shaking detected by the first shake amount detector, and a first average value calculation unit for calculating an average value of the amount of shaking which is detected by the first shake amount detector for a specified duration and from which the first reference value subtraction unit subtracts the first reference value. The second shake correction unit includes a second shake amount detector for detecting the amount of shaking, a second reference value subtraction unit for subtracting a second reference value corresponding to an output value of the second shake amount detector kept in a stationary state from the amount of shaking detected by the second shake amount detector, and a second average value calculation unit for calculating an average value of the amount of shaking which is detected by the second shake amount detector for the specified duration and from which the second reference value subtraction unit subtracts the second reference value. The camera body further includes a reference value correction unit for correcting the first reference value or the second reference value on the basis of a difference between the average value calculated by the first average value calculation unit and that calculated by the second average value calculation unit.

Another aspect of the present invention provides a camera system including an interchangeable lens having a first shake correction unit for correcting an image blurring caused by shaking, and a camera body having a second shake correction unit for correcting an image blurring caused by shaking. In the camera system, the first shake correction unit includes a first shake amount detector for detecting the amount of shaking, and a first reference value subtraction unit for subtracting a first reference value corresponding to an output value of the first shake amount detector kept in a stationary state from the amount of shaking detected by the first shake amount detector. The second shake correction unit includes a second shake amount detector for detecting the amount of shaking, and a second reference value subtraction unit for subtracting a second reference value corresponding to an output value of the second shake amount detector kept in a stationary state from the amount of shaking detected by the second shake amount detector. The camera body further includes a first average value calculation unit for calculating an average value of the amount of shaking which is detected by the first shake amount detector for a specified duration and from which the first reference value subtraction unit subtracts the first reference value, a second average value calculation unit for calculating an average value of the amount of shaking which is detected by the second shake amount detector for the specified duration and from which the second reference value subtraction unit subtracts the second reference value, and a reference value correction unit for correcting the first reference value or the second reference value on the basis of a difference between the average value calculated by the first average value calculation unit and that calculated by the second average value calculation unit.

A further aspect of the present invention provides a shake correction method of a camera system including an interchangeable lens having a first shake correction unit for subtracting a first reference value corresponding to an output value of a first shake amount detector kept in a stationary state from the amount of shaking detected by the first shake amount detector and for correcting an image blurring caused by shaking on the basis of the amount of shaking from which the first reference value has been subtracted, and a camera body having a second shake correction unit for subtracting a second reference value corresponding to an output value of a second shake amount detector kept in a stationary state from the amount of shaking detected by the second shake amount detector and for correcting an image blurring caused by shaking on the basis of the amount of shaking from which the second reference value has been subtracted. The method includes: calculating a first average value that is an average value of the amount of shaking which is detected by the first shake amount detector for a specified duration and from which the first reference value is subtracted; calculating a second average value that is an average value of the amount of shaking which is detected by the second shake amount detector for the specified duration and from which the second reference value is subtracted; and correcting the first reference value or the second reference value on the basis of a difference between the first average value and the second average value.

DESCRIPTION OF EMBODIMENT

An embodiment according to the present invention is described below with reference to the drawings.

Definitions of directions in a camera system according to the embodiment are initially described below with reference to FIG. 1, and a basic idea of a shake correction made in the camera system according to this embodiment is described with reference to FIG. 2. Thereafter, a configuration and operations of the camera system according to the embodiment are described in detail with reference to FIGS. 3 to 9.

Figure 1:
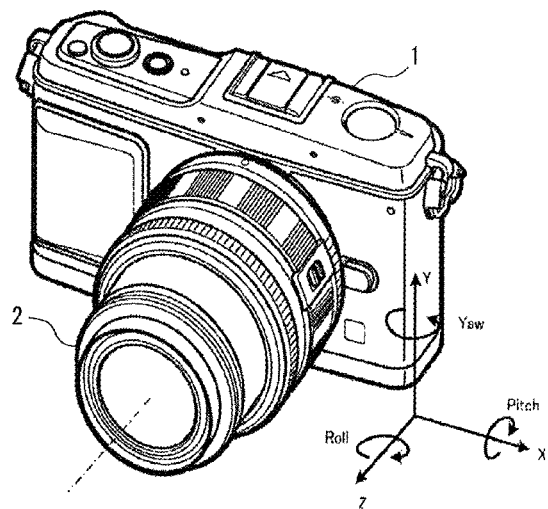
FIG. 1 is an explanatory diagram of definitions of directions in a camera system according to an embodiment.

FIG. 1 is an explanatory diagram of the definitions of the directions in the camera system according to the embodiment.

As illustrated in FIG. 1, the camera system according to the embodiment is a camera system of an interchangeable-lens type in which an interchangeable lens 2 is attached to a camera body 1. An X direction, a Y direction, a Z direction, a pitch direction, a yaw direction and a roll direction in the camera system are defined as follows.

A horizontal direction of the camera body 1 is defined as the X direction. A rightward direction when the front side of the camera body 1 is viewed in the X direction is defined as a +X direction, while a leftward direction when the front side of the camera body 1 is viewed in the X direction is defined as a −X direction. Note that the X direction also corresponds to a horizontal direction of an imaging surface of an imaging element to be described later.

A vertical direction of the camera body 1 is defined as the Y direction. An upward direction in the Y direction is defined as a +Y direction, while a downward direction in the Y direction is defined as a −Y direction. Note that the Y direction also corresponds to a vertical direction of the imaging surface of the imaging element to be described later.

An optical axis direction of the interchangeable lens 2 is defined as the Z direction. Moreover, a direction from a back side to the front side of the camera body 1 in the Z direction is defined as a +Z direction, while a direction from the front side to the back side of the camera body 1 is defined as a −Z direction.

A rotational direction in which an axis in the X direction is a rotational axis is defined as the pitch direction. Moreover, in the pitch direction, a direction of a left rotation in the +X direction is defined as a +pitch direction, while a direction of a right rotation in the +X direction is defined as a −pitch direction.

A rotational direction in which an axis in the Y direction is a rotational axis is defined as the yaw direction. Moreover, in the yaw direction, a direction of a right rotation in the +Y direction is defined as a +yaw direction, while a direction of a left rotation in the +Y direction is defined as a −yaw direction.

A rotational direction in which an axis in the Z direction is a rotational axis is defined as the roll direction. Moreover, a direction of a left rotation in the +Z direction is defined as a +roll direction, while a direction of a right rotation in the +Z direction is defined as a −roll direction.

Plus and minus (+, −) of thus defined directions depend on a direction in which an angular velocity sensor to be described later is mounted, and are not limited to the above described ones as a matter of course.

Figure 2:
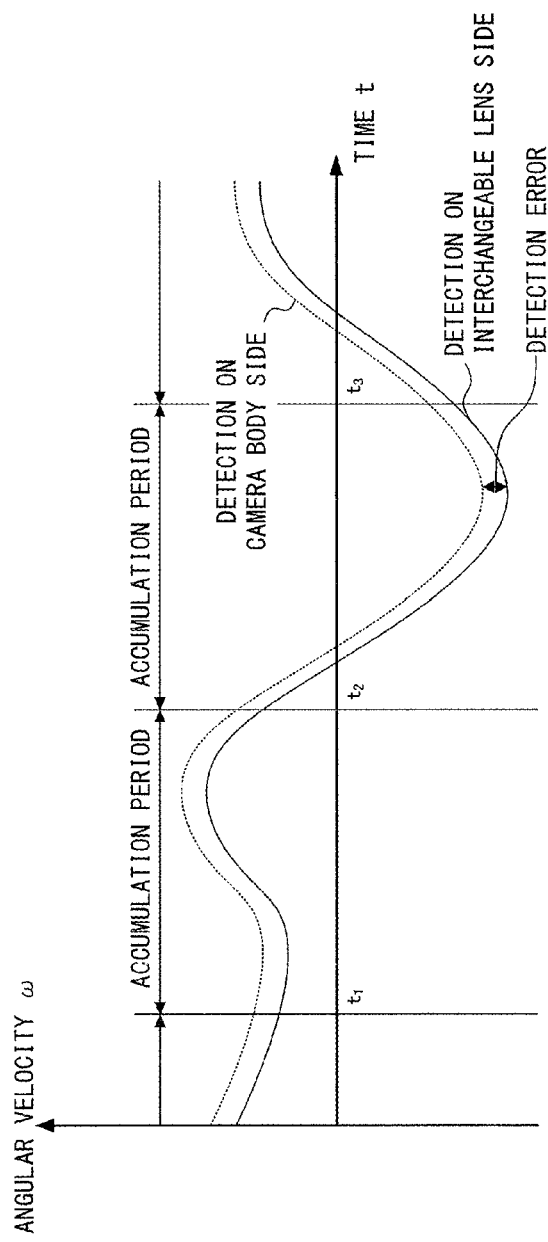
FIG. 2 is an explanatory diagram of a basic idea of a shake correction made in the camera system according to the embodiment, and illustrates one example of temporal changes in angular velocities detected by angular velocity sensors respectively provided in a camera body and an interchangeable lens.

FIG. 2 is an explanatory diagram of a basic idea of a shake correction made in the camera system according to this embodiment, and illustrates one example of temporal changes in angular velocities detected by angular velocity sensors that are respectively provided in the camera body 1 and the interchangeable lens 2, and will be described later.

In FIG. 2, horizontal and vertical axes indicate a time t and an angular velocity co, respectively. Moreover, a curve indicated by a dotted line represents one example of the temporal change in the angular velocity detected by the angular velocity sensor on the camera body 1 side, while a curve indicated by a solid line represents one example of the temporal change in the angular velocity detected by the angular velocity sensor on the interchangeable lens 2 side. Note that, however, the temporal changes in both of the angular velocities are those in the angular velocities in the same direction (the yaw direction or the pitch direction).

When the camera body 1 and the interchangeable lens 2 are combined into one body by attaching the interchangeable lens 2 to the camera body 1, ideally, the angular velocities of both the camera body 1 and the interchangeable lens 2 would match. In reality, however, both of the angular velocities do not match and become different as illustrated in FIG. 2 due to a difference between detection accuracies of both of the angular velocity sensors.

Various types of noise are superposed on an angular velocity detected by the angular velocity sensor. Offset noise caused by a deviation of a reference value (an angular velocity detected by the angular velocity sensor kept in a stationary state) among the types of noise is noise that strongly affects a shake correction performance. When a detected angular velocity includes an error due to an occurrence of the offset noise, a shake correction cannot be properly made even if the shaking is corrected on the basis of the angular velocity. A main factor in the offset noise is a temperature drift (a change of a reference value caused by a temperature characteristic) of an angular velocity sensor.

Assume that the detection accuracy of the angular velocity sensor on the interchangeable lens 2 side is higher than the detection accuracy of the angular velocity sensor on the camera body 1 side in the example illustrated in FIG. 2. In this case, the angular velocity on the interchangeable lens 2 side can be recognized as a true value, and that on the camera body 1 side can be considered to be a value including a constant error with respect to the true value.

In this case, average values of the angular velocities in a certain duration (an accumulation duration (such as a duration from t1 to t2, or a duration from t2 to t3 illustrated in FIG. 2)) are obtained in the changes in the angular velocities both on the camera body 1 side and the interchangeable lens 2 side, and a difference between the average values of both of the angular velocities is obtained, so that offset noise included in the angular velocity on the camera body 1 side can be obtained. Then, the offset noise is subtracted from the angular velocity on the camera body 1 side, whereby the detection accuracy of the angular velocity sensor on the camera body 1 side can be improved to a degree equivalent to the detection accuracy of the angular velocity sensor on the interchangeable lens 2 side.

In the camera system according to this embodiment, the detection accuracy of one of the angular velocity sensors (an angular velocity sensor having a lower detection accuracy) is improved to a degree equivalent to the detection accuracy of the other (an angular velocity sensor having a higher detection accuracy). Then, a shake correction is made by combining both of the shake correction functions, whereby the performance of the shake correction can be made higher than that in a case where the shake correction is made by using only one of the angular velocity sensors.

Figure 3:
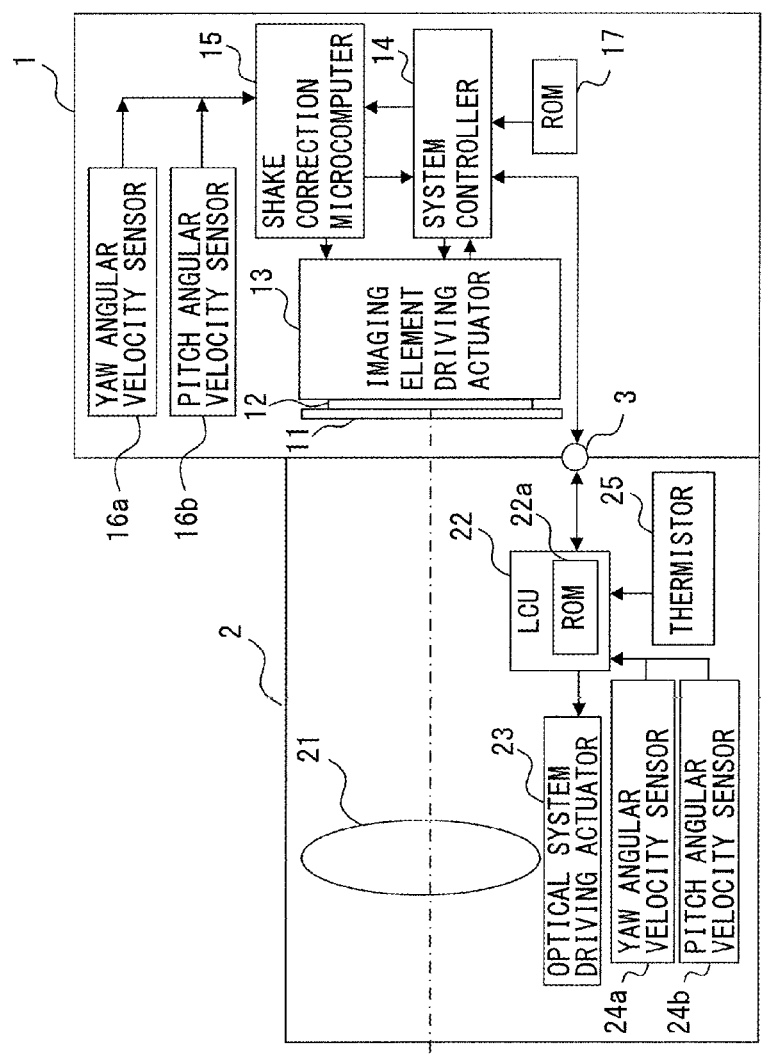
FIG. 3 illustrates a configuration example of the camera system according to the embodiment.

FIG. 3 illustrates a configuration example of the camera system according to this embodiment.

As illustrated in FIG. 3, the camera system according to this embodiment has a configuration where the interchangeable lens 2 is attached to the camera body 1. The camera body 1 is configured so that the interchangeable lens 2 can be freely attached and detached. The interchangeable lens 2 is attached to the camera body 1 in such a way that a lens mount connection part that is provided in the interchangeable lens 2 and not illustrated and a body mount connection part that is provided in the camera body 1 and not illustrated are engaged with each other. Thus, the interchangeable lens 2 is secured to the camera body 1, and also terminals respectively provided in the mount connection parts are electrically connected, so that a communication between the camera body 1 and the interchangeable lens 2 can be performed via a connection point 3.

The camera body 1 includes a focal plane shutter 11, an imaging element 12, an imaging element driving actuator 13, a system controller 14, a shake correction microcomputer 15, a yaw angular velocity sensor 16a, a pitch angular velocity sensor 16b, and a ROM (Read Only Memory) 17.

The focal plane shutter 11 is arranged on the front side of the imaging element 12. The focal plane shutter 11 is opened and closed under the control of the system controller 14, so that the imaging surface of the imaging element 12 is exposed to or shielded from light.

The imaging element 12 is an image sensor such as a CCD (Charge Coupled Device), a CMOS (Complementary Metal Oxide Semiconductor) or the like. The imaging element 12 converts a subject image formed on the imaging surface into an electric signal (photo-electrically converts the image) under the control of the system controller 14. The converted electric signal is read by the system controller 14 as an image signal.

The imaging element driving actuator 13 has a configuration that supports the imaging element 12, and moves the imaging element 12 in a direction of a plane vertical to an optical axis of an optical system 21 under the control of the shake correction microcomputer 15. With this movement, the position of the subject image formed on the imaging surface of the imaging element 12 changes.

The system controller 14 communicates with an LCU (Lens Control Unit) 22 via the connection point 3, and the shake correction microcomputer 15, and controls operations of the entire camera system (the camera body 1 and the interchangeable lens 2). For example, the system controller 14 controls focusing, zooming, an aperture not illustrated and the like by controlling the LCU 22. Moreover, the system controller 14 controls, for example, the focal plane shutter 11 and the imaging element 12. The system controller 14 also controls, for example, the focal plane shutter 11 and the imaging element 12. Moreover, the system controller 14 reads, for example, an image signal from the imaging element 12, and converts the read signal into image data having a specified form. Furthermore, the system controller 14, for example, executes a reference value correction process to be described later with reference to FIG. 6, and various types of processes to be described later with reference to FIG. 9.

The shake correction microcomputer 15 makes a shake correction under the control of the system controller 14. The shake correction microcomputer 15 controls, for example, the imaging element driving actuator 13 on the basis of the output of the yaw angular velocity sensor 16a, the output of the pitch angular velocity sensor 16b, and information about a shake correction sharing ratio to be described later (hereinafter referred to as "shake correction sharing ratio information") so that the imaging element 12 can be moved in a direction for canceling an image blurring caused by shaking. Moreover, the shake correction microcomputer 15 executes, for example, a reference value correction process to be described later with reference to FIG. 7, and the various types of processes to be described later with reference to FIG. 9. Details of the shake correction microcomputer 15 will be described later with reference to FIG. 4.

The yaw angular velocity sensor 16a detects a rotational movement (a posture change) of the camera body 1 in the yaw direction as an angular velocity (hereinafter referred to as a "yaw angular velocity").

The pitch angular velocity sensor 16b detects a rotational movement (a posture change) of the camera body 1 in the pitch direction as an angular velocity (hereinafter referred to as a "pitch angular velocity").

The ROM 17 is a nonvolatile memory in which information about shake detection accuracy on the camera body 1 side (hereinafter referred to as "body side shake detection accuracy information") or the like is stored. The body side shake detection accuracy information includes, for example, accuracy information of a reference value of the yaw angular velocity sensor 16a (hereinafter referred to as a "body side yaw reference value"), and accuracy information of a reference value of the pitch angular velocity sensor 16b (hereinafter referred to as a "body side pitch reference value"). The accuracy information of the body side yaw reference value and the body side pitch reference value are represented, for example, by a value in a unit system such as dps (degrees per second). The accuracy increases as this value becomes smaller.

The interchangeable lens 2 includes the optical system 21, the LCU 22, an optical system driving actuator 23, a yaw angular velocity sensor 24a, a pitch angular velocity sensor 24b and a thermistor 25. The interchangeable lens 2 also includes the aperture not illustrated.

The optical system 21 forms a light flux from a subject as a subject image on the imaging surface of the imaging element 12. The optical system 21 includes a focusing lens, a zoom lens, and a shake correction lens that are not illustrated.

The LCU 22 communicates with the system controller 14 via the connection point 3, and controls operations (including a shake correction operation) of the entire interchangeable lens 2. The LCU 22 controls, for example, focusing, zooming, the aperture and the like under the control of the system controller 14. Moreover, the LCU 22 controls, for example, the optical system driving actuator 23 on the basis of the output of the yaw angular velocity sensor 16a, the output of the pitch angular velocity sensor 16b, and the shake correction sharing ratio information to be described later so that the shake correction lens can be moved in a direction for canceling an image blurring caused by shaking. Additionally, the LCU 22 executes, for example, a reference value correction process to be described later with reference to FIG. 8, and the various types of processes to be described later with reference to FIG. 9. Details of the LCU 22 will be described later with reference to FIG. 5.

The LCU 22 further includes a ROM 22a. The ROM 22a is a nonvolatile memory that stores information about the shake detection accuracy on the interchangeable lens 2 side (hereinafter referred to as "lens side shake detection accuracy information"), and the like. The lens side shake detection accuracy information includes, for example, accuracy information of a reference value of the yaw angular velocity sensor 24a (hereinafter referred to as a "lens side yaw reference value"), and accuracy information of a reference value of the pitch angular velocity sensor 24b (hereinafter referred to as a "lens side pitch reference value"). The accuracy information of the lens side yaw reference value and the lens side pitch reference value are represented, for example, with a value in a unit system such as dps. The accuracy increases as this value becomes smaller.

The optical system driving actuator 23 moves the shake correction lens included in the optical system 21 in a direction of a plane vertical to the optical axis of the optical system 21 under the control of the LCU 22. With this movement, the position of a subject image formed on the imaging surface of the imaging element 12 changes.

The yaw angular velocity sensor 24a detects a rotational movement (a posture change) of the interchangeable lens 2 in the yaw direction as an angular velocity (hereinafter referred to as a "yaw angular velocity").

The pitch angular velocity sensor 24b detects a rotational movement (a posture change) of the interchangeable lens 2 in the pitch direction as an angular velocity (hereinafter referred to as a "pitch angular velocity").

The thermistor 25 detects temperatures in the vicinities of the yaw angular velocity sensor 24a and the pitch angular velocity sensor 24b.

In the camera system according to this embodiment, the interchangeable lens 2 includes the thermistor 25, and the LCU 22 uses reference values (a lens side yaw reference value and a lens side pitch reference value) according to temperatures detected by the thermistor 25. In the meantime, the camera body 1 does not have such a configuration. Therefore, the accuracy of the lens side yaw reference value is higher than the accuracy of the body side yaw reference value, and the accuracy of the lens side pitch reference value is higher than the accuracy of the body side pitch reference value.

Figure 4:
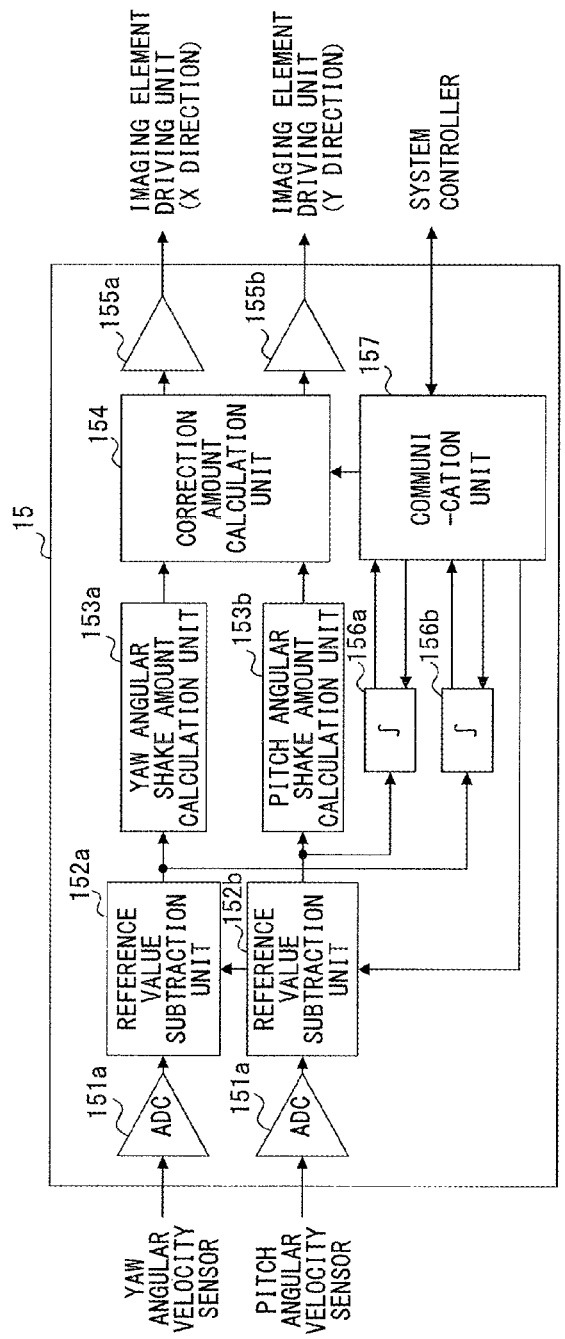
FIG. 4 illustrates details of a configuration example of a shake correction microcomputer.

FIG. 4 illustrates details of a configuration example of the shake correction microcomputer 15.

As illustrated in FIG. 4, the shake correction microcomputer 15 includes ADCs (Analog-to-Digital Converters) 151 (151a, 151b), reference value subtraction units 152 (152a, 152b), a yaw angular shake amount calculation unit 153a, a pitch angular shake amount calculation unit 153b, a correction amount calculation unit 154, drivers 155 (155a, 155b), integration units 156 (156a, 156b), and a communication unit 157.

The ADC 151a converts an analog signal that is the output signal of the yaw angular velocity sensor 16a into a digital signal. The ADC 151b converts an analog signal that is the output signal of the pitch angular velocity sensor 16b into a digital signal.

The reference value subtraction unit 152a subtracts the body side yaw reference value from the yaw angular velocity, which is the output signal (digital signal) of the ADC 151a. The body side yaw reference value is, for example, an average value of the yaw angular velocity obtained via the yaw angular velocity sensor 16a and the ADC 151a for a specified duration in the camera body 1 kept in a stationary state. Moreover, the reference value subtraction unit 152a updates the body side yaw reference value by adding, to the body side yaw reference value, an offset value in the yaw direction on the body side (hereinafter referred to as a "body side yaw offset value") transmitted from the system controller 14 via the communication unit 157. Thus, the body side yaw reference value is corrected, and offset noise caused by a deviation of the body side yaw reference value is removed. Details of the body side yaw offset value will be described later.

The reference value subtraction unit 152b subtracts the body side pitch reference value from the pitch angular velocity, which is the output signal (digital signal) of the ADC 151b. Note that the body side pitch reference value is, for example, an average value of the pitch angular velocity obtained via the pitch angular velocity sensor 16b and the ADC 151b for the specified duration in the camera body 1 kept in a stationary state. Moreover, the reference value subtraction unit 152b updates the body side pitch reference value by adding, to the body side pitch reference value, an offset value in the pitch direction on the body side (hereinafter referred to as a "body side pitch offset value") transmitted from the system controller 14 via the communication unit 157. Thus, the body side pitch reference value is corrected, and offset noise caused by a deviation of the body side pitch reference value is removed. Details of the body side pitch offset value will be described later.

With such operations of the reference value subtraction unit 152a and the reference value subtraction unit 152b, the output values of the reference value subtraction unit 152a and the reference value subtraction unit 152b become a value having a positive or negative sign that indicates a rotational direction, and become 0 when the camera body 1 is kept in a stationary state. The body side yaw reference value and the body side pitch reference value before being updated are not limited to those obtained on the basis of an average of the angular velocity as described above, and may be values obtained with another method.

The yaw angular shake amount calculation unit 153a calculates the amount of an angular change in the yaw direction by temporally integrating the yaw angular velocity from which the reference value subtraction unit 152a subtracts the body side yaw reference value.

The pitch angular shake amount calculation unit 153b calculates the amount of an angular change in the pitch direction by temporally integrating the pitch angular velocity from which the reference value subtraction unit 152b subtracts the body side pitch reference value.

The correction amount calculation unit 154 calculates the amount of a move (the amount of an image blurring) of a subject image in the X direction on the imaging surface of the imaging element 12 on the basis of the amount of an angular change in the yaw direction calculated by the yaw angular shake amount calculation unit 153a, and focal distance information of the optical system 21. Then, the correction amount calculation unit 154 calculates the amount of a correction in the X direction for canceling the amount of a move of the subject image in the X direction on the basis of the amount of a move in the X direction, and shake correction sharing ratio information. Moreover, the correction amount calculation unit 154 calculates the amount of a move (the amount of an image blurring) of the subject image in the Y direction on the imaging surface of the imaging element 12 on the basis of the amount of an angular change in the pitch direction calculated by the pitch angular shake amount calculation unit 153b, and the focal distance information of the optical system 21. Then, the correction amount calculation unit 154 calculates the amount of a correction in the Y direction for canceling the amount of a move of the subject image in the Y direction on the basis of the calculated amount of a move in the Y direction, and the shake correction sharing ratio information. Note that the focal distance information of the optical system 21 and the shake correction sharing ratio information are transmitted from the system controller 14 via the communication unit 157.

The driver 155a outputs, to the imaging element driving actuator 13, a driving pulse according to the amount of a correction in the X direction calculated by the correction amount calculation unit 154. Thus, the imaging element driving actuator 13 moves the imaging element 12 in the X direction by a distance according to the amount of a correction in the X direction.

The driver 155b outputs, to the imaging element driving actuator 13, a driving pulse according to the amount of a correction in the Y direction calculated by the correction amount calculation unit 154. Thus, the imaging element driving actuator 13 moves the imaging element 12 in the Y direction by a distance according to the amount of a correction in the Y direction.

The integration unit 156a accumulates the yaw angular velocity obtained via the yaw angular velocity sensor 16a, the ADC 151a, and the reference value subtraction unit 152a. Moreover, the integration unit 156a obtains an average value of the yaw angular velocity accumulated so far in response to the reception of an average value obtainment request command transmitted from the system controller 14 via the communication unit 157, transmits the obtained average value to the system controller 14 via the communication unit 157, and clears the yaw angular velocity accumulated so far. Thus, the average value of the yaw angular velocity that is accumulated from the reception of the preceding average value obtainment request command up to the reception of the current average value obtainment request command is transmitted to the system controller 14 each time the average value obtainment request command is received from the system controller 14. Accordingly, a duration during which the integration unit 156a accumulates the yaw angular velocity is controllable by the system controller 14. The calculation of the body side yaw offset value becomes more accurate as this accumulation duration increases.

The integration unit 156b accumulates the pitch angular velocity obtained via the pitch angular velocity sensor 16b, the ADC 151b, and the reference value subtraction unit 152b. Moreover, the integration unit 156b obtains an average value of the pitch angular velocity accumulated so far in response to the reception of the average value obtainment request command transmitted from the system controller 14 via the communication unit 157, transmits the obtained average value to the system controller 14 via the communication unit 157, and clears the pitch angular velocity accumulated so far. Thus, the average value of the pitch angular velocity that is accumulated from the reception of the preceding average value obtainment request command up to the reception of the current average value obtainment request command is transmitted to the system controller 14 each time the average value obtainment request command is received from the system controller 14. Accordingly, a duration during which the integration unit 156b accumulates the pitch angular velocity is controllable by the system controller 14. The calculation of the body side pitch offset value becomes more accurate as this accumulation duration increases.

The communication unit 157 communicates with the system controller 14.

Figure 5:
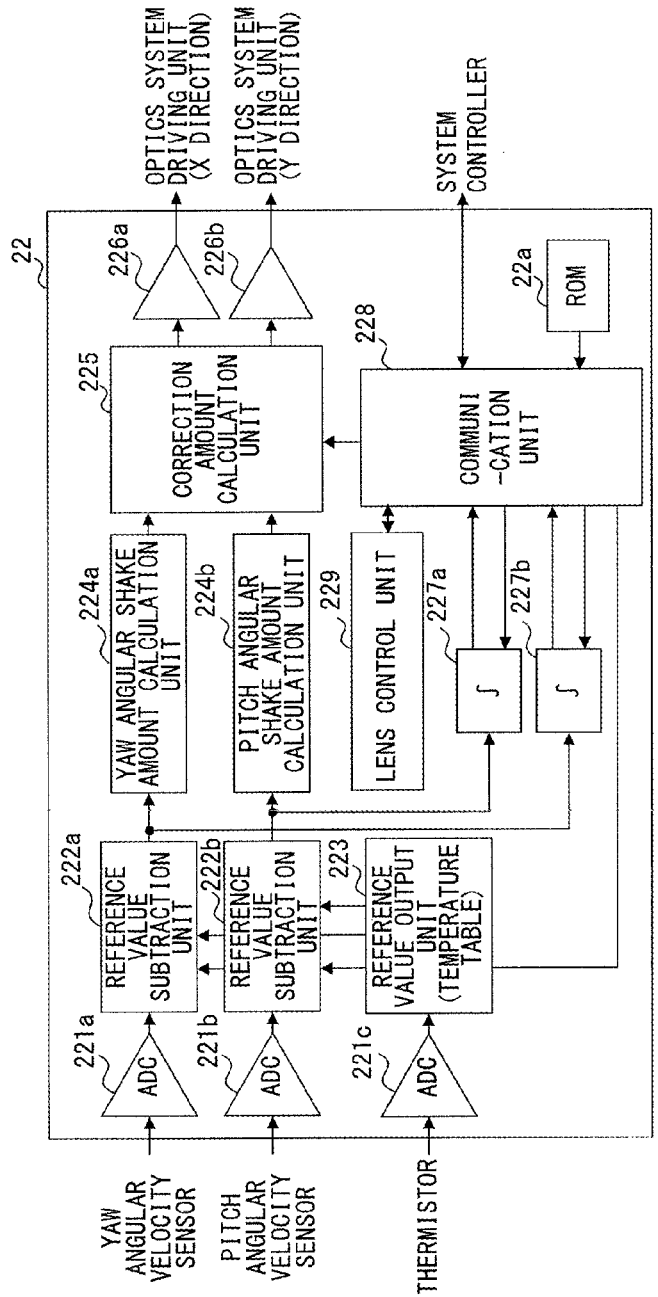
FIG. 5 illustrates details of a configuration example of an LCU.

FIG. 5 illustrates details of a configuration example of the LCU 22.

As illustrated in FIG. 5, the LCU 22 includes ADCs 221 (221a, 221b, 221c), reference value subtraction units 222 (222a, 222b), a reference value output unit 223, a yaw angular shake amount calculation unit 224a, a pitch angular shake amount calculation unit 224b, a correction amount calculation unit 225, drivers 226 (226a, 226b), integration units 227 (227a, 227b), a communication unit 228, a lens control unit 229, and the above described ROM 22a.

The ADC 221a converts an analog signal that is the output signal of the yaw angular velocity sensor 24a into a digital signal. The ADC 221b converts an analog signal that is the output signal of the pitch angular velocity sensor 24b into a digital signal. The ADC 221c converts an analog signal that is the output signal of the thermistor 25 into a digital signal.

The reference value subtraction unit 222a subtracts a lens side yaw reference value from the yaw angular velocity, which is the output signal (digital signal) of the ADC 221a. The lens side yaw reference value is that output from the reference value output unit 223. Moreover, the reference value subtraction unit 222a updates the lens side yaw reference value by adding, to the lens side yaw reference value, an offset value in the yaw direction on the lens side (hereinafter referred to as a "lens side yaw offset value") transmitted from the system controller 14 via the communication unit 228. Thus, the lens side yaw reference value is corrected, and offset noise caused by a deviation of the lens side yaw reference value is removed. Details of the lens side yaw offset value will be described later.

The reference value subtraction unit 222b subtracts the lens side pitch reference value from the pitch angular velocity, which is the output signal (digital signal) of the ADC 221b. Note that the lens side pitch reference value is that output from the reference value output unit 223. Moreover, the reference value subtraction unit 222b updates the lens side pitch reference value by adding, to the lens side pitch reference value, an offset value in the pitch direction on the lens side (hereinafter referred to as a "lens side pitch offset value") transmitted from the system controller 14 via the communication unit 228. Thus, the lens side pitch reference value is corrected, and the offset noise caused by a deviation of the lens side pitch reference value is removed. Details of the lens side pitch offset value will be described later.

With such processes of the reference value subtraction unit 222a and the reference value subtraction unit 222b, the output values of the reference value subtraction unit 222a and the reference value subtraction unit 222b become a value having a positive or negative sign that indicates a rotational direction, and become 0 when the interchangeable lens 2 is kept in a stationary state.

The reference value output unit 223 includes a table that indicates an association among a temperature, a lens side yaw reference value and a lens side pitch reference value. The reference value output unit 223 outputs, to the reference value subtraction unit 222a, a lens side yaw reference value according to a temperature, which is the output signal (digital signal) of the ADC 221c, on the basis of the table, and also outputs, to the reference value subtraction unit 222b, a lens side pitch reference value according to the temperature. Here, the lens side yaw reference value according to the temperature is an average value of the yaw angular velocity obtained via the yaw angular velocity sensor 24a and the ADC 221a during a specified duration, for example, when the interchangeable lens 2 is kept in a stationary state and an ambient temperature of the yaw angular velocity sensor 24a is equal to the temperature. Moreover, the lens side pitch reference value according to the temperature is an average value of the pitch angular velocity obtained via the pitch angular velocity sensor 24b and the ADC 221b for a specified duration, for example, when the interchangeable lens 2 is kept in a stationary state and an ambient temperature of the pitch angular velocity sensor 24b is equal to the temperature. The lens side yaw reference value and the lens side pitch reference value according to the temperature are not limited to those obtained by averaging the angular velocity in this way. The lens side yaw reference value and the lens side pitch reference value may be those obtained with another method.

With these operations of the reference value output unit 223, the reference value subtraction unit 222 (222a, 222b) subtracts a reference value according to a temperature detected by the thermistor 25, whereby a deviation of the reference value caused by a temperature drift of the angular velocity sensor (24a, 24b) can be reduced, and shake detection can be performed with higher accuracy.

The yaw angular shake amount calculation unit 224a calculates the amount of an angular change in the yaw direction by temporally integrating the yaw angular velocity from which the reference value subtraction unit 222a subtracts the lens side yaw reference value.

The pitch angular shake amount calculation unit 224b calculates the amount of an angular change in the pitch direction by temporally integrating the pitch angular velocity from which the reference value subtraction unit 222b subtracts the lens side pitch reference value.

The correction amount calculation unit 225 calculates the amount of a move (the amount of an image blurring) of a subject image in the X direction on the imaging surface of the imaging element 12 on the basis of the amount of an angular change in the yaw direction calculated by the yaw angular shake amount calculation unit 224a, and the focal distance information of the optical system 21. Then, the correction amount calculation unit 225 calculates the amount of a correction in the X direction for canceling the amount of a move of the subject image in the X direction on the basis of the amount of a move in the X direction, and shake correction sharing ratio information. Moreover, the correction amount calculation unit 225 calculates the amount of a move (the amount of an image blurring) of the subject image in the Y direction on the imaging surface of the imaging element 12 on the basis of the amount of an angular change in the pitch direction calculated by the pitch angular shake amount calculation unit 222b, and the focal distance information of the optical system 21. Then, the correction amount calculation unit 225 calculates the amount of a correction in the Y direction for canceling the amount of a move of the subject image in the Y direction on the basis of the amount of a move in the Y direction, and the shake correction sharing ratio information. Note that the focal distance information of the optical system 21 is transmitted from the lens control unit 229 and the shake correction sharing ratio information is transmitted from the system controller 14 via the communication unit 228.

The driver 226a outputs, to the optical system driving actuator 23, a driving pulse according to the amount of a correction in the X direction calculated by the correction amount calculation unit 225. Thus, the optical system driving actuator 23 moves the shake correction lens in the X direction by a distance according to the amount of a correction in the X direction.

The driver 226b outputs, to the optical system driving actuator 23, a driving pulse according to the amount of a correction in the Y direction calculated by the correction amount calculation unit 225. Thus, the optical system driving actuator 23 moves the shake correction lens in the Y direction by a distance according to the amount of a correction in the Y direction.

The integration unit 227a accumulates the yaw angular velocity obtained via the yaw angular velocity sensor 24a, the ADC 221a, and the reference value subtraction unit 222a. Moreover, the integration unit 227a obtains an average value of the yaw angular velocity accumulated so far in response to the reception of the average value obtainment request command transmitted from the system controller 14 via the communication unit 228, transmits the obtained average value to the system controller 14 via the communication unit 228, and clears the yaw angular velocity accumulated so far. Thus, the average value of the yaw angular velocity accumulated from the reception of the preceding average value obtainment request command up to the reception of the current average value obtainment request command is transmitted to the system controller 14 each time the average value obtainment request command is received from the system controller 14. Accordingly, a duration during which the integration unit 227a accumulates the yaw angular velocity is controllable by the system controller 14. The calculation of the lens side yaw offset value becomes more accurate as this accumulation period increases.

The integration unit 227b accumulates the pitch angular velocity obtained via the pitch angular velocity sensor 24b, the ADC 221b, and the reference value subtraction unit 222b. Moreover, the integration unit 227b obtains an average value of the pitch angular velocity accumulated so far in response to the reception of the average value obtainment request command transmitted from the system controller 14 via the communication unit 228, transmits the obtained average value to the system controller 14 via the communication unit 228, and clears the pitch angular velocity accumulated so far. Thus, the average value of the pitch angular velocity accumulated from the reception of the preceding average value obtainment request command up to the reception of the current average value obtainment request command is transmitted to the system controller 14 each time the average value obtainment request command is received from the system controller 14. Accordingly, a duration during which the integration unit 227b accumulates the pitch angular velocity is controllable by the system controller 14. The calculation of the lens side pitch offset value becomes more accurate as this accumulation duration increases.

The communication unit 228 communicates with the system controller 14.

The lens control unit 229 controls focusing, zooming, the aperture and the like under the control of the system controller 14. Moreover, the lens control unit 229 monitors the state of the optical system 21, and transmits information about the state of the optical system 21 (hereinafter referred to as "status information of the optical system 21") to the system controller 14 via the communication unit 228 in response to a lens status information obtainment request command transmitted from the system controller 14 via the communication unit 228. The status information of the optical system 21 includes information such as the focal distance of the optical system 21, the position of the focusing lens, a shake correction range of the LCU 22, and the like. Here, the shake correction range of the LCU 22 indicates an image blurring correction range correctable by a shake correction made by the LCU 22, and is decided in accordance with the focal distance of the optical system 21. Moreover, the lens control unit 229 transmits the focal distance information of the optical system 21 to the correction amount calculation unit 225.

The ROM 22a stores lens side shake detection accuracy information as described above. The lens side shake detection accuracy information is read in response to an accuracy information obtainment request command transmitted from the system controller 14 via the communication unit 228, and is transmitted to the system controller 14 via the communication unit 228.

The configuration that is related to the shake correction and included in the interchangeable lens 2 in the camera system according to this embodiment having the above described configuration is one example of a first shake correction unit for correcting an image blurring caused by shaking. The configuration that is related to the shake correction and included in the camera body 1 is one example of a second shake correction unit for correcting an image blurring caused by shaking. The angular velocity sensors 24 (24a, 24b) of the interchangeable lens 2 are one example of a first shake amount detector for detecting the amount of shaking. The reference value subtraction units 222 (222a, 222b) of the LCU 22 of the interchangeable lens 2 are one example of a first reference value subtraction unit for subtracting a first reference value corresponding to the output value of the first shake amount detector kept in a stationary state from the amount of shaking detected by the first shake amount detector. The angular velocity sensors 16 (16a, 16b) of the camera body 1 are one example of a second shake amount detector for detecting the amount of shaking. The reference value subtraction units 152 (152a, 152b) of the shake correction microcomputer 15 of the camera body 1 are one example of a second reference value subtraction unit for subtracting a second reference value corresponding to the output value of the second shake amount detector kept in a stationary state from the amount of shaking detected by the second shake amount detector. The integration units 227 (227a, 227b) of the LCU 22 of the interchangeable lens 2 are one example of a first average value calculation unit for calculating the average value of the amount of shaking which is detected by the first shake amount detector for a specified duration and from which the first reference value subtraction unit subtracts the first reference value. The integration units 156 (156a, 156b) of the shake correction microcomputer 15 of the camera body 1 are one example of the second average value calculation unit for calculating the average value of the amount of shaking which is detected by the second shake amount detector for a specified duration and from which the second reference value subtraction unit subtracts the second reference value. Some of the functions of the system controller 14 of the camera body 1 are one example of a reference value correction unit for correcting the first reference value or the second reference value on the basis of a difference between the average value calculated by the first average value calculation unit and that calculated by the second average value calculation unit. The ROM 22a that stores lens side shake detection accuracy information is one example of a first memory that stores first shake detection accuracy information about the shake detection accuracy of the first shake correction unit. The ROM 17 that stores the body side shake detection accuracy information is one example of a second memory that stores second shake detection accuracy information about the shake detection accuracy of the second shake correction unit. Some of the other functions of the system controller 14 of the camera body 1 are one example of a determination unit for determining which of the shake detection accuracies of the first shake correction unit and the second shake correction unit is higher on the basis of the first shake detection accuracy information stored in the first memory and the second shake detection accuracy information stored in the second memory. The optical system driving actuator 23 is one example of a first shake correction mechanism. The imaging element driving actuator 13 is one example of a second shake correction driving actuator. The configuration for driving the optical system driving actuator 23 on the basis of the output of the reference value subtraction unit 222 (222a, 222b) and the shake correction sharing ratio information in the LCU 22 is one example of a first shake correction driving actuator for driving the first shake correction mechanism on the basis of the amount of shaking from which the first reference value subtraction unit subtracts the first reference value, and the shake correction sharing ratio of the first shake correction unit to the second shake correction unit. The configuration for driving the imaging element driving actuator 13 on the basis of the output of the reference value subtraction unit 152 (152, 152b) and the shake correction sharing ratio information in the shake correction microcomputer 15 is one example of a second shake correction driving actuator for driving a second shake correction mechanism on the basis of the amount of shaking from which the second reference value subtraction unit subtracts the second reference value and the shake correction sharing ratio.

Figure 6:
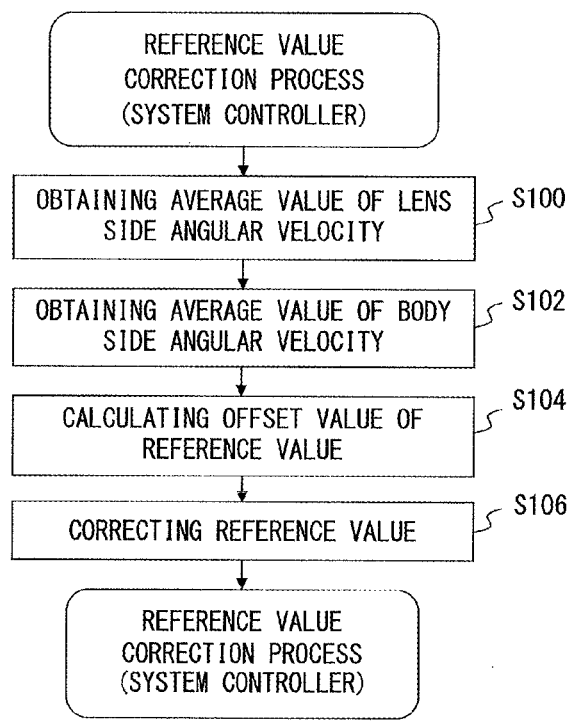
FIG. 6 is an example of a flowchart illustrating content of a reference value correction process executed by a system controller of the camera body.

FIG. 6 is one example of a flowchart illustrating content of the reference value correction process executed by the system controller 14 of the camera body 1. The process of the flowchart illustrated in FIG. 6 is, for example, a periodically executed process. Here, the periodically executed process is, for example, a process executed at intervals of one second.

As illustrated in FIG. 6, once this process has been started, the system controller 14 transmits an average value obtainment request command to the LCU 22, and obtains the average values of the yaw angular velocity and the pitch angular velocity from the LCU 22 (the integration units 227a, 227b) (S100).

Then, the system controller 14 transmits an average value obtainment request command to the shake correction microcomputer 15, and obtains the average values of the yaw angular velocity and the pitch angular velocity from the shake correction microcomputer 15 (the integration units 156a, 156b) (S102).

Either of S100 and S102 may be executed first.

Then, the system controller 14 executes a process for calculating an offset value of a reference value (S104). More specifically, the system controller 14 calculates, as a body side yaw offset value or a lens side yaw offset value, a difference between the average value of the yaw angular velocity on the interchangeable lens 2 side obtained in S100 and the average value of the yaw angular velocity on the camera body 1 side obtained in S102 on the basis of the lens side shake detection accuracy information and the body side shake detection accuracy information. Moreover, the system controller 14 calculates, as a body side pitch offset value or a lens side pitch offset value, a difference between the average value of the pitch angular velocity on the interchangeable lens 2 side obtained in S100 and the average value of the pitch angular velocity on the camera body 1 side obtained in S102. Note that the lens side shake detection accuracy information is obtained from the LCU 22 as a response to an accuracy information obtainment request command that the system controller 14 transmits to the LCU 22. Moreover, the body side shake detection accuracy information is read from the ROM 17.

Next, the system controller 14 executes a process for correcting a reference value (S106). More specifically, the system controller 14 transmits the body side yaw offset value or the lens side yaw offset value calculated in S104 to the camera body 1 or the interchangeable lens 2. The system controller 14 also transmits the body side pitch offset value or the lens side pitch offset value calculated in S104 to the camera body 1 or the interchangeable lens 2. Thus, the body side yaw reference value or the lens side yaw reference value is corrected, and the body side pitch reference value or the lens side pitch reference value is corrected.

The process of the flowchart illustrated in FIG. 6 will also be referred to in the process of the system controller 14 illustrated in FIG. 9 to be described later.

Figure 7:
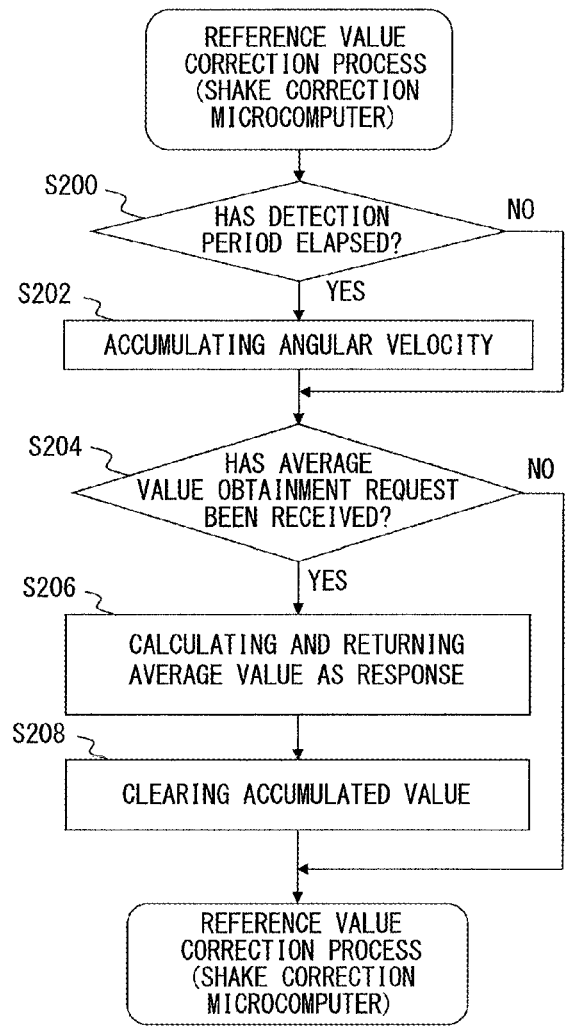
FIG. 7 is one example of a flowchart illustrating content of a reference value correction process executed by the shake correction microcomputer of the camera body.

FIG. 7 is one example of a flowchart illustrating content of the reference value correction process executed by the shake correction microcomputer 15 of the camera body 1.

As illustrated in FIG. 7, once this process is started, the shake correction microcomputer 15 initially determines whether a detection period has elapsed (S200). Note that the detection period is a period in which the ADC 151 (151a, 151b) performs an AD (Analog-to-Digital) conversion in order to detect an angular velocity. For example, when a sampling rate of the ADC 151 (an AD conversion rate) is 1 kHz, the detection period is 1 ms. Moreover, this detection period is a shorter period than a repetitive period in which the process of the flowchart illustrated in FIG. 6 is periodically executed.

When a result of the determination made in S200 is "YES", the integration unit 156a of the shake correction microcomputer 15 adds, to a value of the yaw angular velocity accumulated so far, the yaw angular velocity for which the ADC 151a performs an AD conversion and from which the reference value subtraction unit 152a subtracts the body side yaw reference value, while the integration unit 156b of the shake correction microcomputer 15 adds, to a value of the pitch angular velocity accumulated so far, a pitch angular velocity for which the ADC 151b performs an AD conversion and from which the reference value subtraction unit 152b subtracts the body side pitch reference value (S202).

In the meantime, when the result of the determination made in S200 is "NO" or after S202, the shake correction microcomputer 15 determines whether an average value obtainment request command has been received from the system controller (S204).

When a result of the determination made in S204 is "YES", the integration unit 156a of the shake correction microcomputer 15 obtains the average value of the yaw angular velocity accumulated so far, and transmits the obtained average value to the system controller 14, while the integration unit 156b of the shake correction microcomputer 15 obtains the average value of the pitch angular velocity accumulated so far, and transmits the obtained average value to the system controller (S206).

After S206, the integration unit 156a of the shake correction microcomputer 15 clears the yaw angular velocity accumulated so far (the accumulated value of the yaw angular velocity), while the integration unit 156b of the shake correction microcomputer 15 clears the pitch angular velocity accumulated so far (the accumulated value of the pitch angular velocity) (S208).

In the meantime, when the result of the determination made in S204 is "NO" or after S208, the process returns to S200, although this is not illustrated.

The process of the flowchart illustrated in FIG. 7 will also be referred to in the process of the shake correction microcomputer 15 illustrated in FIG. 9 to be described later.

Figure 8:
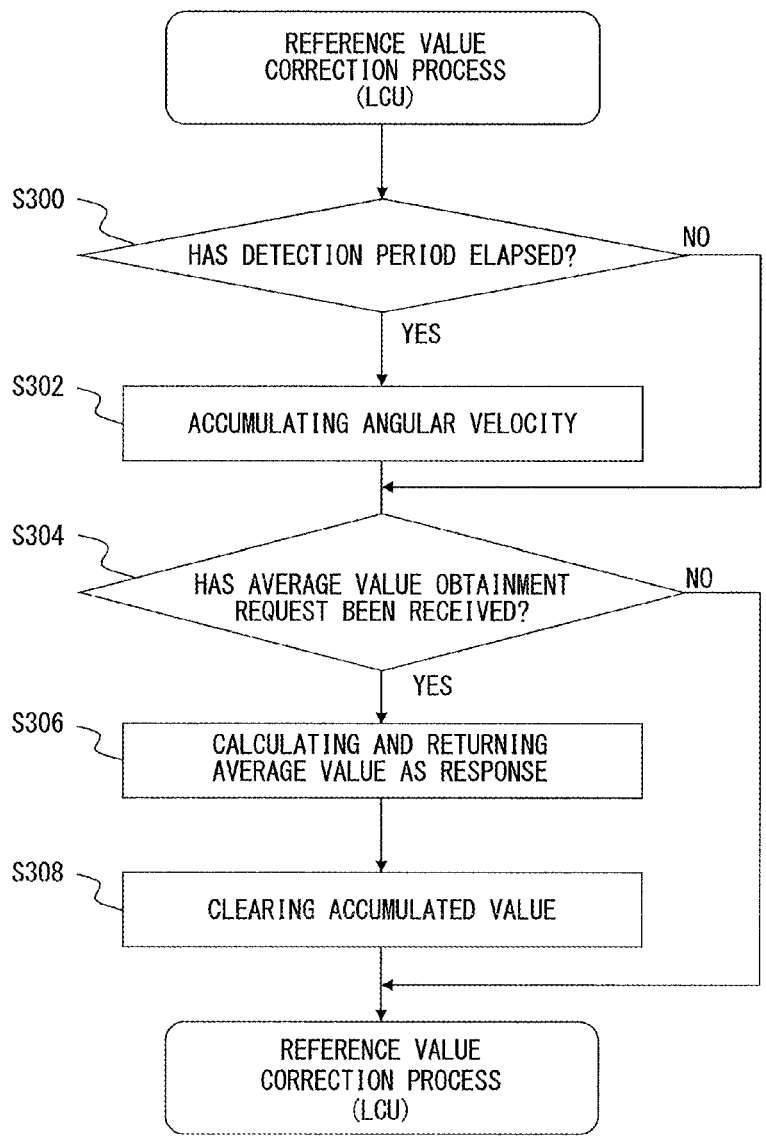
FIG. 8 is one example of a flowchart illustrating content of a reference value correction process executed by the LCU of the interchangeable lens.

FIG. 8 is one example of a flowchart illustrating content of the reference value correction process executed by the LCU 22 of the interchangeable lens 2.

As illustrated in FIG. 8, once this process is started, the LCU 22 initially determines whether the detection period has elapsed (S300). Note that the detection period is a period in which the ADC 221 (221a, 221b) performs an AD conversion in order to detect an angular velocity. For example, when the sampling rate of the ADC 221 is 1 kHz, the detection period is 1 ms. Moreover, this detection period is a shorter period than a repetitive period in a case where the process of the flowchart illustrated in FIG. 6 is periodically executed.

When a result of the determination made in S300 is "YES", the integration unit 227a of the LCU 22 adds, to the value of the yaw angular velocity accumulated so far, the yaw angular velocity for which the ADC 221a performs an AD conversion and from which the reference value subtraction unit 222a subtracts the lens side yaw reference value, while the integration unit 227b of the LCU 22 adds, to the value of the pitch angular velocity accumulated so far, the pitch angular velocity for which the ADC 221b performs an AD conversion and from which the reference value subtraction unit 222b subtracts the lens side pitch reference value (S302).

In the meantime, when the result of the determination made in S300 is "NO" or after S302, the LCU 22 determines whether an average value obtainment request command has been received from the system controller 14 (S304).

When a result of the determination made in S304 is "YES", the integration unit 227a of the LCU 22 obtains the average value of the yaw angular velocity accumulated so far, and transmits the obtained average value to the system controller 14, while the integration unit 227b of the LCU 22 obtains the average value of the pitch angular velocity accumulated so far, and transmits the obtained average value to the system controller 14 (S306).

After S306, the integration unit 227a of the LCU 22 clears the yaw angular velocity accumulated so far (the accumulated value of the yaw angular velocity), while the integration unit 227b of the LCU 22 clears the pitch angular velocity accumulated so far (the accumulated value of the pitch angular velocity) (S308).

In the meantime, when the result of the determination made in S304 is "NO" or after S308, the process returns to S300, although this is not illustrated.

The process of the flowchart illustrated in FIG. 8 is also referred to in the process of the LCU 22 illustrated in FIG. 9 to be described later.

Figure 9:
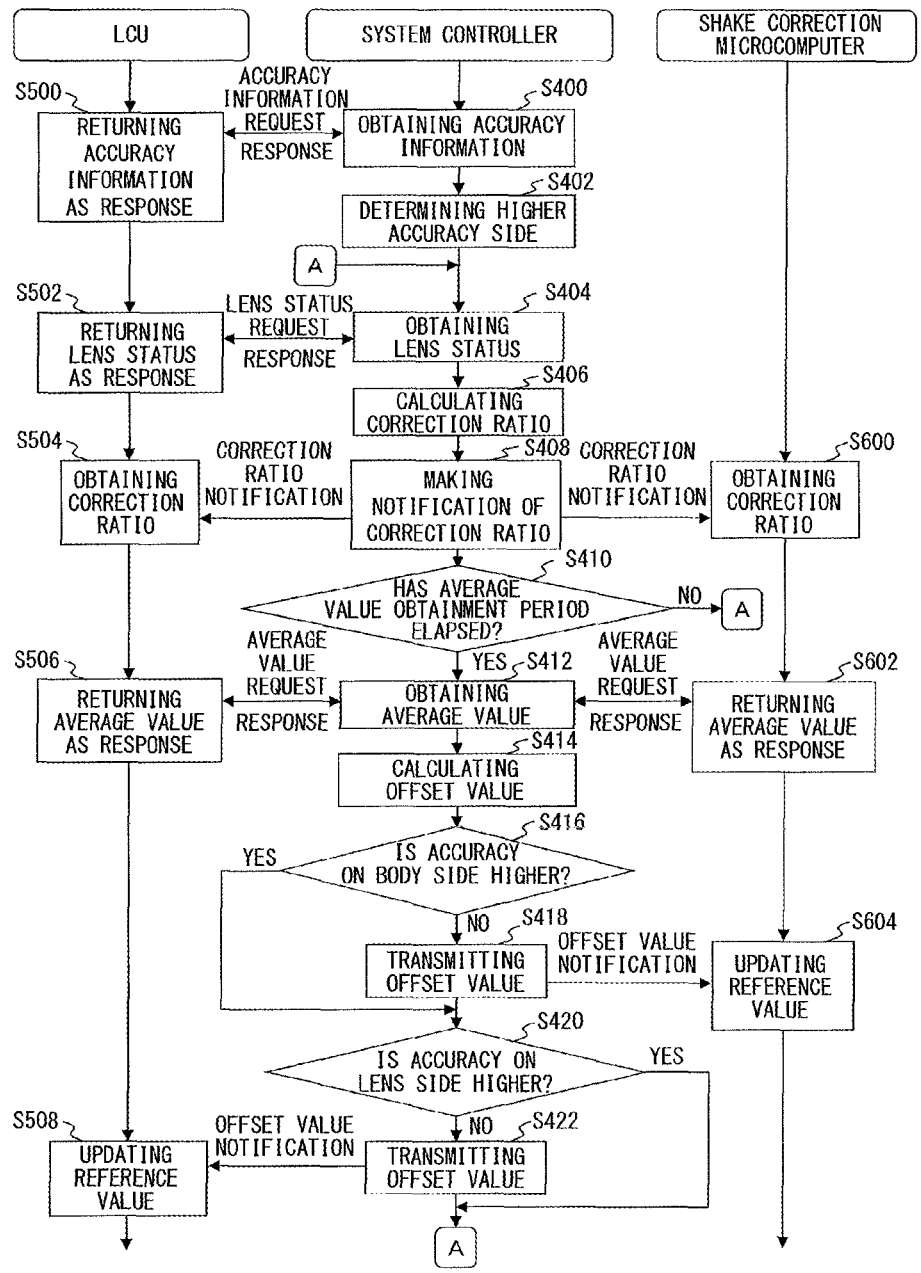
FIG. 9 is one example of a flowchart illustrating details of content of a reference value correction process that the system controller of the camera body executes while respectively communicating with the shake correction microcomputer of the camera body and the LCU of the interchangeable lens.

FIG. 9 is one example of a flowchart illustrating details of content of the reference value correction process that the system controller 14 of the camera body 1 executes while respectively communicating with the shake correction microcomputer 15 of the camera body 1 and the LCU 22 of the interchangeable lens 2. The flowchart illustrated in FIG. 9 also includes the processes of the flowcharts illustrated in FIGS. 6 to 8.

As illustrated in FIG. 9, once the camera system according to this embodiment is activated to invoke this process, the system controller 14 initially transmits an accuracy information obtainment request command to the LCU 22, and receives (obtains) lens side shake detection accuracy information from the LCU 22 as a response to the command (S400, S500).

Then, the system controller 14 determines which of the shake detection accuracies is higher on the basis of the lens side shake detection accuracy information obtained in S400, and the body side shake detection accuracy information read from the ROM 17 (S402). More specifically, the system controller 14 determines which of the accuracies of the lens side yaw reference value and the body side yaw reference value is higher on the basis of accuracy information of the lens side yaw reference value included in the lens side shake detection accuracy information, and accuracy information of the body side yaw reference value included in the body side shake detection accuracy information. The system controller 14 also determines which of the accuracies of the lens side pitch reference value and the body side pitch reference value is higher on the basis of the accuracy information of the lens side pitch reference value included in the lens side shake detection accuracy information, and the accuracy information of the body side pitch reference value included in the body side shake detection accuracy information.

In the determination made in S402, when the accuracies of the lens side yaw reference value and the body side yaw reference value are equal and also the accuracies of the lens side pitch reference value and the body side pitch reference value are equal, the process may return to S404 to be described later subsequently to S408 to be described later without executing the process in and after step S410 to be described later.

After S402, the system controller 14 transmits a lens status information obtainment request command to the LCU 22, and receives (obtains) status information of the optical system 21 (including information of the focal distance, the position of the focusing lens, and the shake correction range of the LCU 22) from the LCU 22 as a response to the command (S404, S502).

Then, the system controller 14 calculates a shake correction sharing ratio of the shake correction microcomputer 15 to the LCU 22 when the shake correction microcomputer 15 and the LCU 22 share and make a shake correction (when the shake correction is made by combining the shake correction made by the shake correction microcomputer 15 and that by the LCU 22) (S406). The system controller 14 calculates the shake correction sharing ratio information, for example, in accordance with the ratio of the shake correction range of the shake correction microcomputer 15 to the shake correction range of the LCU 22. Note that the shake correction range of the shake correction microcomputer 15 is a correction range in which the shake correction microcomputer 15 can correct an image blurring, and information of the range is stored, for example, in the ROM 17. Moreover, the shake correction range of the LCU 22 is a range according to information that is included in the status information of the optical system 21 obtained in S404 and is pursuant to the information about the shake correction range of the LCU 22. In this example, the shake correction sharing ratio is calculated in this way. However, the shake correction sharing ratio may be calculated with another method, or may be defined as a fixed ratio of 1 to 1.

Next, the system controller 14 transmits the shake correction sharing ratio calculated in S406 respectively to the LCU 22 and the shake correction microcomputer 15 (notifies the LCU 22 and the shake correction microcomputer 15 of the shake correction sharing ratio), so that the LCU 22 and the shake correction microcomputer 15 respectively receive (obtain) the shake correction sharing ratio (S408, S504, S600).

Then, the system controller 14 determines whether an average value obtainment period has elapsed (S410). The average value obtainment period is a period in which the system controller 14 transmits an average value obtainment request command respectively to the LCU 22 and the shake correction microcomputer 15.

When a result of the determination made in S410 is "NO", the process returns to S404.

In the meantime, when the result of the determination made in S410 is "YES", the system controller 14 transmits the average value obtainment request command respectively to the LCU 22 and the shake correction microcomputer 15, and receives (obtains) the average values of the yaw angular velocity and the pitch angular velocity respectively from the LCU 22 and the shake correction microcomputer 15 (S412, S506, S602). Here, by setting, to a shorter period than the detection period of the angular velocity, a difference between the transmission timing of the average value obtainment request command to the LCU 22 and the transmission timing of the average value obtainment request command to the shake correction microcomputer 15, a deviation of the accumulation period of the angular velocity can be reduced to one detection period at a maximum. For example, when the sampling rate of the angular velocity is 1 kHz, the difference between the transmission timings may be set to a shorter period than 1 ms.

Then, the system controller 14 executes a process for calculating the offset value of the reference value (S414). More specifically, the system controller 14 calculates, as a body side yaw offset value or a lens side yaw offset value, a difference between the average value of the yaw angular velocity obtained from the LCU 22 in S412 and the average value of the yaw angular velocity obtained from the shake correction microcomputer 15 in S412 in accordance with the result of the determination made in S402. Namely, when the result of the determination made in S402 is a result such that the accuracy of the body side yaw reference value is higher than the accuracy of the lens side yaw reference value, the system controller 14 calculates, as the lens side yaw offset value, the difference between the average values of the yaw angular velocities. In contrast, when the result of the determination is a result such that the accuracy of the lens side yaw reference value is higher than the accuracy of the body side yaw reference value, the system controller 14 calculates the difference as the body side yaw offset value. The system controller 14 also calculates, as the body side pitch offset value or the lens side pitch offset value, the difference between the average value of the pitch angular velocity obtained from the LCU 22 in S412 and the average value of the pitch angular velocity obtained from the shake correction microcomputer 15 in S412 in accordance with the result of the determination made in S402. Namely, when the result of the determination made in S402 is a result such that the accuracy of the body side pitch reference value is higher than the accuracy of the lens side pitch reference value, the system controller 14 calculates the difference between the average values of the pitch angular velocities as the lens side pitch offset value. In contrast, when the result of the determination made in S402 is a result such that the accuracy of the lens side pitch reference value is higher than the accuracy of the body side pitch reference value, the system controller 14 calculates the difference between the accuracies as the body side pitch offset value.

Next, the system controller 14 determines whether the shake detection accuracies in both the yaw direction and the pitch direction on the camera body 1 side are higher than those on the interchangeable lens side 2, on the basis of the determination made in S402 (S416). This determination is also a determination of whether a condition that the accuracy of the body side yaw reference value be higher than the accuracy of the lens side yaw reference value and that the accuracy of the body side pitch reference value be higher than the accuracy of the lens side pitch reference value is satisfied on the basis of the result of the determination made in S402.

When a result of the determination made in S416 is "NO", the system controller 14 transmits, to the shake correction microcomputer 15, the body side yaw offset value calculated in S414 if the result of the determination made in S402 is a result such that the accuracy of the lens side yaw reference value is higher than the accuracy of the body side yaw reference value, or transmits, to the shake correction microcomputer 15, the body side pitch offset value calculated in S414 if the result of the determination made in S402 is a result such that the accuracy of the lens side pitch reference value is higher than the accuracy of the body side pitch reference value (S418).

When either or both of the body side yaw offset value and the body side pitch offset value have been transmitted in S418, the shake correction microcomputer 15 receives either or both of the offset values, and updates either or both of the body side yaw reference value and the body side pitch reference value on the basis of the received value or values (S604). Thus, either or both of the body side yaw reference value and the body side pitch reference value are corrected, whereby either or both of the shake detection accuracies in the yaw direction and the pitch direction on the camera body 1 side can be improved.

In contrast, when the result of the determination made in S416 is "YES" or after S418, the system controller 14 also determines whether the shake detection accuracies in both the yaw direction and the pitch direction on the interchangeable lens 2 side are higher than those on the camera body 1 side, on the basis of the result of the determination made in S402 (S420). This determination is a determination of whether a condition that the accuracy of the lens side yaw reference value be higher than the accuracy of the body side yaw reference value and that the accuracy of the lens side pitch reference value be higher than the accuracy of the body side pitch reference value is satisfied on the basis of the result of the determination made in S402.

When the result of the determination made in S420 is "NO", the system controller 14 transmits, to the LCU 22, the lens side yaw offset value calculated in S414 if the accuracy of the body side yaw reference value is higher than the accuracy of the lens side yaw reference value, or transmits, to the LCU 22, the lens side pitch offset value calculated in S414 if the accuracy of the body side pitch reference value is higher than the accuracy of the lens side pitch reference value in the determination made in S402 (S422).

When either or both of the lens side yaw offset value and the lens side pitch offset value have been transmitted in S422, the LCU 22 receives either or both of the offset values, and updates either or both of the lens side yaw reference value and the lens side pitch reference value on the basis of the received offset value or values (S508). Thus, either or both of the lens side yaw reference value and the lens side pitch reference value are corrected, so that either or both of the shake detection accuracies in the yaw direction and the pitch direction on the interchangeable lens 2 side can be improved.

In contrast, when the result of the determination made in S420 is "YES" or after S422, the process returns to S404.

In the camera system according to this embodiment, the shake detection accuracy on the interchangeable lens 2 side is higher than that on the camera body 1 side in both the yaw direction and the pitch direction as described above. Thus, the aforementioned processes of the flowcharts illustrated in FIGS. 6 to 9 are executed, so that the reference values (the body side yaw reference value and the body side pitch reference value) on the camera body 1 side are corrected, and the shake detection accuracy on the camera body 1 side is improved to a degree equivalent to that on the interchangeable lens 2 side.

Additionally, in the camera system according to this embodiment, the LCU 22 and the shake correction microcomputer 15 share and make a shake correction in accordance with the above described shake correction sharing ratio, so that a shake correction is implemented by combining the shake correction made by the LCU 22 and that made by the shake correction microcomputer 15.

As described above, with the camera system according to this embodiment, both the camera body 1 and the interchangeable lens 2 have the shake correction function. When a difference exists between the shake detection accuracies of the shake correction functions of both the camera body 1 and the interchangeable lens 2, a lower shake detection accuracy can be improved to a degree equivalent to the higher shake detection accuracy. Moreover, both of the shake correction functions are operated to share a shake correction when being made, so that a shake correction range can be expanded more than that in a case where only either of the shake correction functions is operated. Therefore, in the camera system according to this embodiment, even if a difference exists between the shake detection accuracies of both of the shake correction functions when a shake correction is made by combining the shake correction functions of both the camera body 1 and the interchangeable lens 2, the performance of the shake correction can be improved more than that in a case where only either of the shake correction functions is used.

The camera system according to this embodiment eliminates the need to convey a result of a shake detection made by one of the shake correction functions to the other when a shake correction is made by combining both of the shake correction functions of the camera body 1 and the interchangeable lens 2. The camera system according to this embodiment also eliminates the need to convey information yet to be corrected by one of the shake correction functions to the other. Accordingly, the camera system according to this embodiment does not pose a problem such that a response of a shake correction operation is delayed by a signal delay caused by the conveyance, and a shake correction performance is deteriorated due to a shake detection signal degradation caused by signal wiring needed for the conveyance.

The camera system according to this embodiment can be modified in various ways.

For example, in the camera system according to this embodiment, the interchangeable lens 2 is configured so that a reference value according to a temperature detected by the thermistor 25 can be used. However, the camera body 1 side may have such a configuration instead of the interchangeable lens 2 side. Namely, the camera body 1 may have the thermistor, and may use a reference value according to a temperature detected by the thermistor.

Additionally, in the camera system according to this embodiment, for example, the reference value output unit 223 of the LCU 22 of the interchangeable lens 2 may output a reference value according to a detected temperature by using a primary approximate expression that represents a relationship between a temperature and a reference value as a replacement for the temperature table.

Furthermore, in the camera system according to this embodiment, for example, the system controller 14 of the camera body 1 may calculate the average values of angular velocities that are calculated by the integration units 156 of the shake correction microcomputer 15 of the camera body 1, and by the integration units 227 of the LCU 22 of the interchangeable lens 2. Namely, the system controller 14 may transmit an accumulated value obtainment request command to the shake correction microcomputer 15 and the LCU 22 as a replacement for an average value obtainment request command, may obtain accumulated values (accumulated values of the angular velocities) respectively from the shake correction microcomputer 15 and the LCU 22 as a response to the command, and may calculate an average value of each of the accumulated values.

Still further, in the camera system according to this embodiment, for example, the system controller 14 of the camera body 1 may obtain shake detection accuracy information on the interchangeable lens 2 side as follows. By way of example, information about an association between identification information of an interchangeable lens and shake detection accuracy information of the interchangeable lens may be prestored in the ROM 17 of the camera body 1. Then, the system controller 14 may obtain identification information from an interchangeable lens when the interchangeable lens is attached to the camera body 1, and may obtain shake detection accuracy information according to the identification information on the basis of the above described information about an association.

The aforementioned embodiment refers to the specific example of the present invention for ease of understanding of the invention. The present invention, however, is not limited to the above described embodiment. The present invention can be diversely modified and changed within a scope that does not depart from the concept of the present invention stipulated by the claims.

What is claimed is:

1. A camera system including an interchangeable lens having a first shake correction apparatus for correcting an image blurring caused by shaking, and a camera body having a second shake correction apparatus for correcting an image blurring caused by shaking, wherein:

the first shake correction apparatus comprises
a first shake amount detector configured to detect the amount of shaking, and
a first shake correction processor comprising:
a first reference value subtraction circuit for subtracting a first reference value corresponding to an output value of the first shake amount detector kept in a stationary state from the amount of shaking detected by the first shake amount detector, and
a first average value calculation circuit for calculating an average value of the amount of shaking which is detected by the first shake amount detector for a specified duration and from which the first reference value subtraction circuit subtracts the first reference value;

the second shake correction apparatus comprises
   a second shake amount detector configured to detect the amount of shaking, and
   a second shake correction processor comprising:
     a second reference value subtraction circuit for subtracting a second reference value corresponding to an output value of the second shake amount detector kept in a stationary state from the amount of shaking detected by the second shake amount detector, and
     a second average value calculation circuit for calculating an average value of the amount of shaking which is detected by the second shake amount detector for the specified duration and from which the second reference value subtraction circuit subtracts the second reference value; and
the camera body further comprises a reference value correction circuit for correcting the first reference value or the second reference value on the basis of a difference between the average value calculated by the first average value calculation circuit and the average value calculated by the second average value calculation circuit.

2. A camera system including an interchangeable lens having a first shake correction apparatus for correcting an image blurring caused by shaking, and a camera body having a second shake correction apparatus for correcting an image blurring caused by shaking, wherein:
the first shake correction apparatus comprises
   a first shake amount detector configured to detect the amount of shaking, and
   a first shake correction processor comprising a first reference value subtraction circuit for subtracting a first reference value corresponding to an output value of the first shake amount detector kept in a stationary state from the amount of shaking detected by the first shake amount detector;
the second shake correction apparatus comprises
   a second shake amount detector configured to detect the amount of shaking, and
   a second shake correction processor comprising a second reference value subtraction circuit for subtracting a second reference value corresponding to an output value of the second shake amount detector kept in a stationary state from the amount of shaking detected by the second shake amount detector; and
the camera body further comprises
   a first average value calculation circuit for calculating an average value of the amount of shaking which is detected by the first shake amount detector for a specified duration and from which the first reference value subtraction circuit subtracts the first reference value,
   a second average value calculation circuit for calculating an average value of the amount of shaking which is detected by the second shake amount detector for the specified duration and from which the second reference value subtraction circuit subtracts the second reference value, and
   a reference value correction circuit for correcting the first reference value or the second reference value on the basis of a difference between the average value calculated by the first average value calculation circuit and the average value calculated by the second average value calculation circuit.

3. The camera system according to claim 1, wherein:
the interchangeable lens further comprises
   a first memory that stores first shake detection accuracy information about a shake detection accuracy of the first shake correction apparatus;
the camera body further comprises
   a second memory that stores second shake detection accuracy information about a shake detection accuracy of the second shake correction apparatus, and
   a determination circuit for determining which of the shake detection accuracies of the first shake correction apparatus and the second shake correction apparatus is higher on the basis of the first shake detection accuracy information stored in the first memory and the second shake detection accuracy information stored in the second memory; and
the reference value correction circuit corrects the second reference value when the determination circuit determines that the shake correction accuracy of the first shake correction apparatus is higher than the shake detection accuracy of the second shake correction apparatus, or corrects the first reference value when the determination circuit determines that the shake detection accuracy of the second shake correction apparatus is higher than the shake detection accuracy of the first shake correction apparatus.

4. The camera system according to claim 2, wherein:
the interchangeable lens further comprises
   a first memory that stores first shake detection accuracy information about a shake detection accuracy of the first shake correction apparatus;
the camera body further comprises
   a second memory that stores second shake detection accuracy information about a shake detection accuracy of the second shake correction apparatus, and
   a determination circuit for determining which of the shake detection accuracies of the first shake correction apparatus and the second shake correction apparatus is higher on the basis of first shake detection accuracy information stored in the first memory and second shake detection accuracy information stored in the second memory; and
the reference value correction circuit corrects the second reference value when the determination circuit determines that the shake detection accuracy of the first shake correction apparatus is higher than the shake detection accuracy of the second shake correction apparatus, or corrects the first reference value when the determination circuit determines that the shake detection accuracy of the second shake correction apparatus is higher than the shake detection accuracy of the first shake correction apparatus.

5. The camera system according to claim 1, wherein
the camera body transmits, to the interchangeable lens, a command for obtaining, from the interchangeable lens, an average value of the amount of shaking which is detected by the first shake amount detector for the specified duration and from which the first reference value subtraction circuit subtracts the first reference value, and
the camera body transmits an offset value of the first reference value to the interchangeable lens.

6. The camera system according to claim 2, wherein
the camera body transmits, to the interchangeable lens, a command for obtaining, from the interchangeable lens, an accumulated value of the amount of shaking which is detected by the first shake amount detector for the specified duration and from which the first reference value subtraction circuit subtracts the first reference value, and the camera body transmits an offset value of the first reference value to the interchangeable lens.

7. The camera system according to claim 3, wherein the camera body transmits, to the interchangeable lens, a command for obtaining, from the interchangeable lens, first shake detection accuracy information stored in the first memory.

8. The camera system according to claim 4, wherein the camera body transmits, to the interchangeable lens, a command for obtaining, from the interchangeable lens, first shake detection accuracy information stored in the first memory.

9. The camera system according to claim 1, wherein:
the first shake correction apparatus further comprises
  a first shake correction driving actuator that drives a first shake correction mechanism on the basis of the amount of shaking from which the first reference value subtraction circuit subtracts the first reference value, and a shake correction sharing ratio of the first shake correction apparatus to the second shake correction apparatus; and
the second shake correction apparatus further comprises
  a second shake correction driving actuator that drives a second shake correction mechanism on the basis of the amount of shaking from which the second reference value subtraction circuit subtracts the second reference value, and the shake correction sharing ratio.

10. The camera system according to claim 2, wherein:
the first shake correction apparatus further comprises
  a first shake correction driving actuator that drives a first shake correction mechanism on the basis of the amount of shaking from which the first reference value subtraction circuit subtracts the first reference value, and a shake correction sharing ratio of the first shake correction apparatus to the second shake correction apparatus; and
the second shake correction apparatus further comprises
  a second shake correction driving actuator that drives a second shake correction mechanism on the basis of the amount of shaking from which the second reference value subtraction circuit subtracts the second reference value, and the shake correction sharing ratio.

11. The camera system according to claim 9, wherein the shake correction sharing ratio is decided on the basis of optical system status information about a state of an optical system included in the interchangeable lens.

12. The camera system according to claim 10, wherein the shake correction sharing ratio is decided on the basis of optical system status information about a state of an optical system included in the interchangeable lens.

13. A shake correction method of a camera system including an interchangeable lens having a first shake correction apparatus for subtracting a first reference value corresponding to an output value of a first shake amount detector kept in a stationary state from the amount of shaking detected by the first shake amount detector and for correcting an image blurring caused by shaking on the basis of the amount of shaking from which the first reference value has been subtracted, and a camera body having a second shake correction apparatus for subtracting a second reference value corresponding to an output value of a second shake amount detector kept in a stationary state from the amount of shaking detected by the second shake amount detector and for correcting an image blurring caused by shaking on the basis of the amount of shaking from which the second reference value has been subtracted, the method comprising:
  calculating a first average value that is an average value of the amount of shaking which is detected by the first shake amount detector for a specified duration and from which the first reference value is subtracted;
  calculating a second average value that is an average value of the amount of shaking which is detected by the second shake amount detector for the specified duration and from which the second reference value is subtracted; and
  correcting the first reference value or the second reference value on the basis of a difference between the first average value and the second average value.

* * * * *